US006874223B2

(12) United States Patent
Reilley

(10) Patent No.: US 6,874,223 B2
(45) Date of Patent: Apr. 5, 2005

(54) SYSTEM AND METHOD FOR SECURELY POSITIONING APPARATUS WITHIN A HOUSING

(75) Inventor: Natalie Reilley, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 42 days.

(21) Appl. No.: 10/283,459

(22) Filed: Oct. 30, 2002

(65) Prior Publication Data

US 2004/0083591 A1 May 6, 2004

(51) Int. Cl.[7] ................................................ G11B 5/127

(52) U.S. Cl. ..................... 29/603.03; 29/426.5; 29/758; 29/428; 361/685; 361/683

(58) Field of Search ................................ 29/428, 426.5, 29/603.03, 434, 464, 466, 467, 757, 758, 602.02, 602.04, 602.05; 361/685, 683, 684; 269/903

(56) References Cited

U.S. PATENT DOCUMENTS 5,537,271 A * 7/1996 Kumai et al. ............ 360/99.06

5,610,781 A * 3/1997 Watanabe ................ 360/99.06

6,606,241 B2 * 8/2003 Moore ........................ 361/685

* cited by examiner

*Primary Examiner*—David P. Bryant

*Assistant Examiner*—Stephen Kenny

(57) ABSTRACT

In one embodiment, a device is attached to a support by positioning fasteners into the device at the leading and trailing edges of the device and then positioning the device with respect to the support such that the leading edge fastener(s) slide downward into a slot in a first bracket and the trailing edge fastener slides laterally downward into a slot in a second fastener causing both the first and second fasteners to be captured by lateral slots in the first and second brackets. In the embodiment, the first bracket has an L shaped slot while the slot in the second bracket includes a ramp. After the fasteners are captured by the brackets, the user, in one embodiment, may tighten the fasteners from the outside of a housing in which the support resides by inserting a tightening tool through openings in the housing.

11 Claims, 4 Drawing Sheets

102' 101' 11 102 101 50 420 424 423 422 511 414 410 413 412 411 51 510 512

10
102'
101'
11
102
105
104
101
111
112
30
32
43'
42'
31
40(50)
402
41'
103
42
43
401
22
41
21
20
101
110
111
12
111

102'
101'
11
102
105
104
101
404
43'
42'
402
41'
403
405
40
404
420
424
42
43
401
423
422
421
414
410
413
41
412
411

102'
101'
11
102
101
50
424
420
423
422
414
410
50
511
413
412
411
51
510
512

SYSTEM AND METHOD FOR SECURELY POSITIONING APPARATUS WITHIN A HOUSING

FIELD OF THE INVENTION

This invention relates to apparatus positioning and more particularly to a system and method for securely positioning and attaching apparatus within a housing.

BACKGROUND

An apparatus, especially electrical apparatus, often must be added to, or removed from, its housing. In many situations, untrained users are required to do such removals and/or additions. One problem that exists in such a situation is that when screws are used to secure the apparatus in place they must be short enough so that when they are fully tightened they will not cause electrical problems within the apparatus. However, short screws are difficult to hold while they are being threaded into the apparatus. This problem is compounded in situations where the screws must be inserted into (or removed from) the apparatus after the apparatus is positioned within a housing.

A further problem exists in that the screws, or other fastener devices, must also pass through a support bracket in order to firmly secure the device to the housing. This then presents alignment problems since the threaded holes in the apparatus must line up with holes through the support brackets. Then the user, working through an opening in the housing, must use some form of a tool, usually a screwdriver, to insert the screw through both the support bracket and into the device to be secured. This procedure is tedious at best and for many users very difficult to achieve.

BRIEF SUMMARY

One embodiment showing the teachings of the invention includes a method of attaching apparatus to a support, by positioning fasteners into the apparatus, with at least one of the fasteners at a leading portion of the apparatus and at least one fastener at a trailing portion of the apparatus and by inserting the apparatus into the support such that the leading portion fastener slides downward into a slot in a first bracket and by lowering the trailing portion fastener into a slot in a second bracket so that the trailing portion fastener slides laterally downward causing both the first and second fasteners to be captured by lateral slots in the first and second brackets.

In another embodiment showing the teaching of the invention there is shown a method of removing a device from a housing by removing a cover from the sides of the housing and inserting a tool through openings exposed when the cover is removed and using the inserted tool, loosening fasteners which extend through brackets and into the device and pushing the device laterally so that at least one of the brackets rotates one end of the device out of the bracket; and manually lifting the other end of the device to free the device of the brackets.

Another embodiment showing the teaching of the invention includes a system for mounting a device within a housing, the system comprising at least one first bracket having a top opening slot into which a shank of a fastener located at a leading portion of the device can engage, said first bracket also having a slot communicating with the top opening slot, the top opening slot adapted for receiving the fastener when the device is moving perpendicular to the direction of insertion of the device into the housing, the communicating slot adapted for allowing the fastener shank inserted into the top opening slot to move laterally with respect to the direction of insertion, and at least one second bracket having a top opening into which a shank of a fastener located at a trailing portion of the device can engage, the second bracket having a slot communicating with the top opening, the second bracket top opening adapted for receiving the trailing portion fastener when the device is moving perpendicular to the direction of insertion of said device into the housing, the second bracket communicating slot adapted for forcing a fastener inserted into the second bracket top opening to move diagonally along the lateral direction, the diagonal movement serving to laterally move the fastening device which has been positioned into the first bracket along the first bracket communicating slot.

In another embodiment showing the teaching of the invention there is shown a set of brackets, the bracket set including at least one pair of brackets for capturing and supporting an electronics device, the pair of brackets adapted for receiving the electronic device, the pair of brackets comprising a first bracket having an L shaped slot therein, the slot sized to accept in an opening at the top end of the slot the shank of a fastener affixed to a leading portion of the device, and further sized to not allow a head of the fastener to enter the slot and a second bracket having a modified L shaped slot therein, the modified L shape having a top portion extending from a top opening via a ramp portion to a laterally extending lower portion, the slot sized for accepting a shank of a fastener affixed to a trailing portion of the device, and further sized to not allow a head of the fastener to enter said slot.

DETAILED DESCRIPTION

Figure 1:
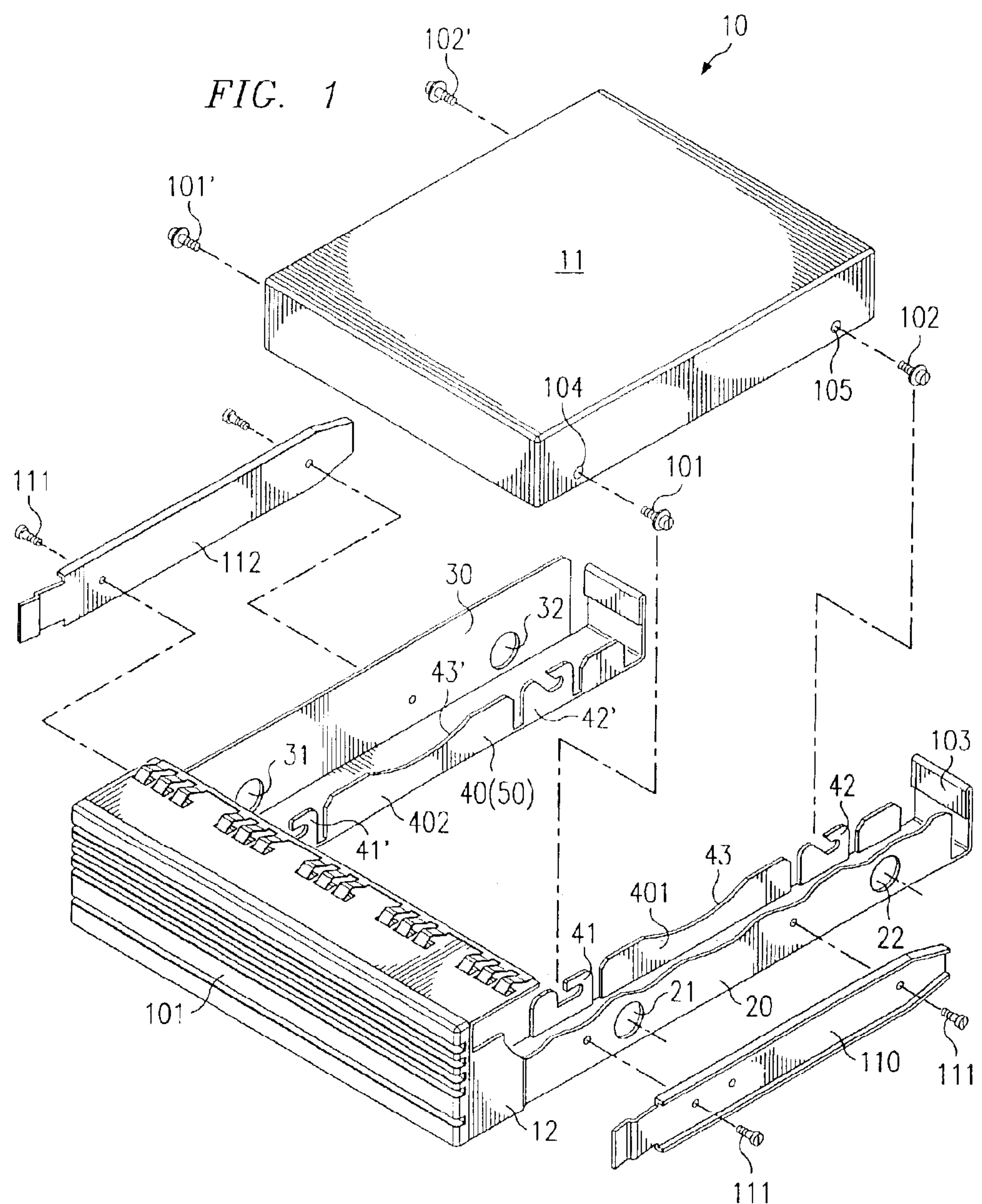
FIG. 1 is an exploded view of a housing containing one illustrative embodiment.

Turning now to FIG. 1, there is shown an exploded view of a housing containing one illustrative embodiment 10 in which apparatus (device) 11 is to be mounted within housing 12. Housing 12 is shown with its top removed. Housing 12 could be any height and could, and mostly likely would, contain multiple apparatus the same or similar to apparatus 11. Back 103 of housing 12 would either not be present or would be moved out of the way so that apparatus 11 can be installed within housing 12. Screws or other fastening devices 101, 102, 101', 102' are inserted into holes 104, 105 of apparatus 11.

While FIG. 1 of the illustrative embodiment shows four such fastening devices inserted into apparatus 11, it should be understood that there can be any number of such fastening devices. Also, while the fastening devices are shown on the sides of apparatus 11, they could, in fact, be positioned on the front or back taking advantage of the concepts disclosed herein.

Housing 12 has right side 20 (as viewed from the front) and left side 30. Right side 20 has openings 21 and 22 therein, and left side 30 has similar openings. As will be seen hereinafter, when apparatus 11 is to be placed into housing 12, or removed from housing 12, optional side panels 110 and 112 are removed from sides 20 and 30 by the removal of fastening devices 111.

When it is desired to position apparatus 11 inside housing 12, the user grips apparatus 11 from the sides of apparatus 11 and inserts apparatus 11 from the top (as shown) or through the back of housing 12 such that fastening devices 101 and 101' are positioned within brackets 41 and 41', respectively. After fastening devices 101 and 101' enter brackets 41 and 41', fastening devices 102 and 102' are positioned within brackets 42 and 42'. As will be more fully discussed hereinafter, brackets 42 and 42' are constructed to seat fasteners 101, 101', 102, 102' within brackets 41, 41', 42, 42', respectively. Brackets 41, 41', 42, 42' are supported by housing 12. Housing 12 itself can act as a support which, in turn, can be positioned inside another housing, either singularly or in combination with other apparatus.

Figure 2:
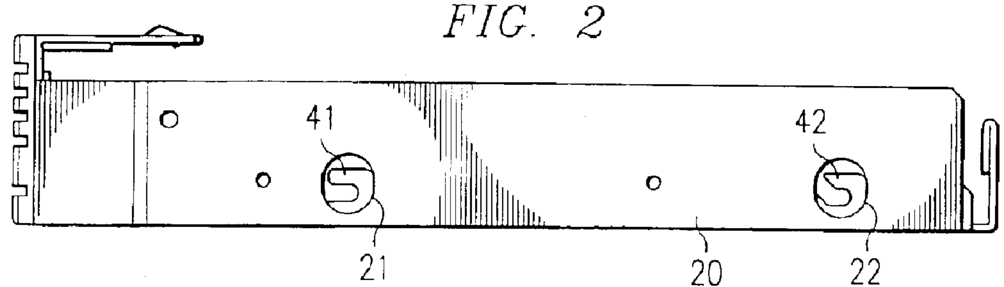
FIG. 2 is a right side view from the outside of the housing of FIG. 1 with the optional cover removed.

FIG. 2 is a right side view from the outside of housing 12, with optional side cover 110 off. Bracket 41 can be seen through opening 21 in side 20 while bracket 42 can be seen through opening 22.

As will be discussed, when apparatus 11 (FIG. 1) is positioned inside housing 12, fastening devices 101 and 102 would be positioned in the slots in brackets 41 and 42 and a user could tighten (or loosen) the pre-positioned fasteners by inserting and turning a tool (for example, a screw driver if the fastening device was a screw) into opening 21 (22).

Figure 3:
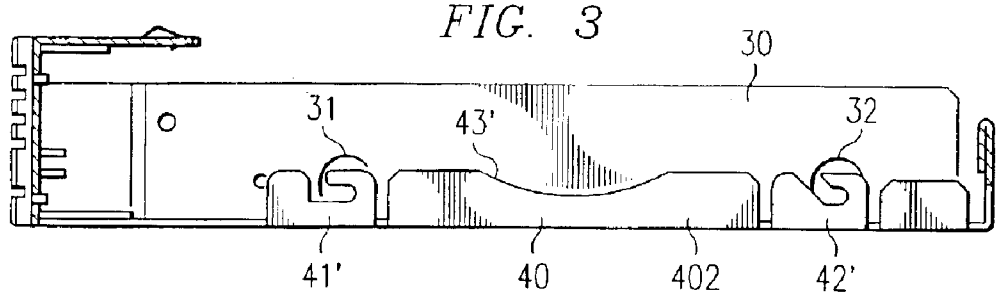
FIG. 3 is a left side view from the inside of the housing of FIG. 1.

FIG. 3 is the left side view of side 30 from the inside of the housing 12 of FIG. 1. Bracket 41' is the forward bracket which will receive fastening device 101', in the manner to be discussed, while bracket 42' is the rear most bracket and will receive fastening device 102', also, in the manner to be discussed.

Figure 4:
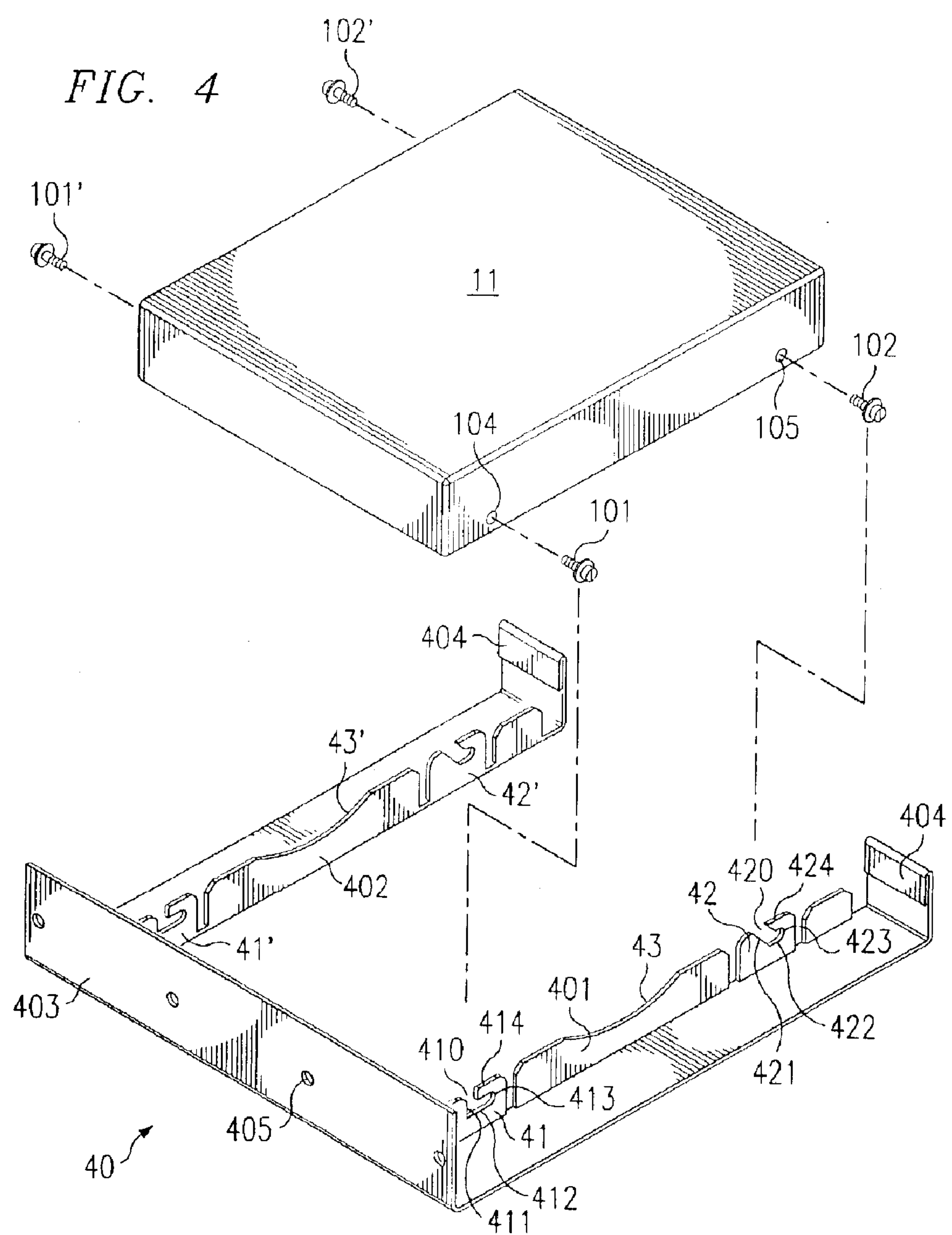
FIG. 4 is a perspective view of one illustrative embodiment.

FIG. 4 is a perspective view of one illustrative embodiment where support 40 has a front 403 and back portions 404. Front 403 has optional holes 405 for mounting support 40 to housing 12 as shown in FIG. 1. Similar holes or other mounting devices could be utilized to mount sides 401 and 402 to sides 20 and 30 (FIG. 1), respectively, of housing 12. Support 40 has bracket 41 which has downwardly sloping side 411, base portion 412 of the bracket, a stop portion 413 and a partial cover 414. Bracket 41 has opening 410 for receiving a fastener device, such as fastener device 101 of apparatus 11.

Support 40 also has at least one bracket 42 which is constructed with sloping side 421, base portion 422, stop portion 423, and partial cover portion 424. Bracket 42 has opening 420 for receiving a fastening device, such as, fastening device 102 of apparatus 11.

Indention 43 and 43' are optionally available to allow the user's fingers to manipulate the apparatus 11 for insertion or removing from housing 12 (FIG. 1). Note that as discussed above, although apparatus 11 is shown dropping straight down into bracket 40, it actually can slide in and out from the back, if desired.

When apparatus 11 is to be inserted into support 40 (which in turn is mounted within housing 12, FIG. 1), fastening device 101 (and, if available, 101') is inserted into opening 410 of slot 41 causing fastening device 101 to fall downward along surface 411 to base 412. At this point, rear most (trailing edge) fasteners 102 (102') are above slot opening 420 of bracket 42.

The user then inserts fastener 102 into opening 420 of bracket 42. Fastener 102 moves laterally toward the rear of support 40 because of rear sloping portion 421 of bracket 42. This lateral movement pulls all of the fasteners 101, 101', 102, 102' backward along surface 412, 422, respectively, where they are held in place by overhang 414, 424, respectively. Note that rear sloping ramp 421 which controls the rearward lateral movement could be a forward sloping ramp causing apparatus 11 to slide forward into the brackets. This lateral movement allows the fastening devices to move clear of the bracket openings thereby achieving a better gripping surface when tightened.

Once apparatus 11 is in place the user, using a tightening device, as discussed above, inserts that device through holes 21, 22, 31, 32 (FIG. 1) to tighten pre-positioned fasteners 101, 102, 101', and 102' in apparatus 11. At that point the user can, if desired, place sides 110, 112 against sides 20 and 30 to cover up the holes and finish the installation.

Removal of apparatus 11, or any other apparatus mounted in this manner, from housing 12 (FIG. 1) is accomplished by first removing panels 110 and 112 by removing fasteners 111, and inserting a tool through holes 21, 22, 31, 32 to remove or loosen fastening devices 101, 102, 101', 102'. The user then moves apparatus 11 forward causing the back of apparatus 11 to rise upward along slop 421, (seen in FIG. 4) of bracket 42, 42'. Once the rear end of apparatus 11 is free of brackets 42, 42' the user, by rotating the front of apparatus 11 upwards, can remove fasteners 101 101' from brackets 41, 41'. Note that optional sides 110, 112 can be attached with snaps, screws, glue, friction, Velcro®, etc.

Figure 5:
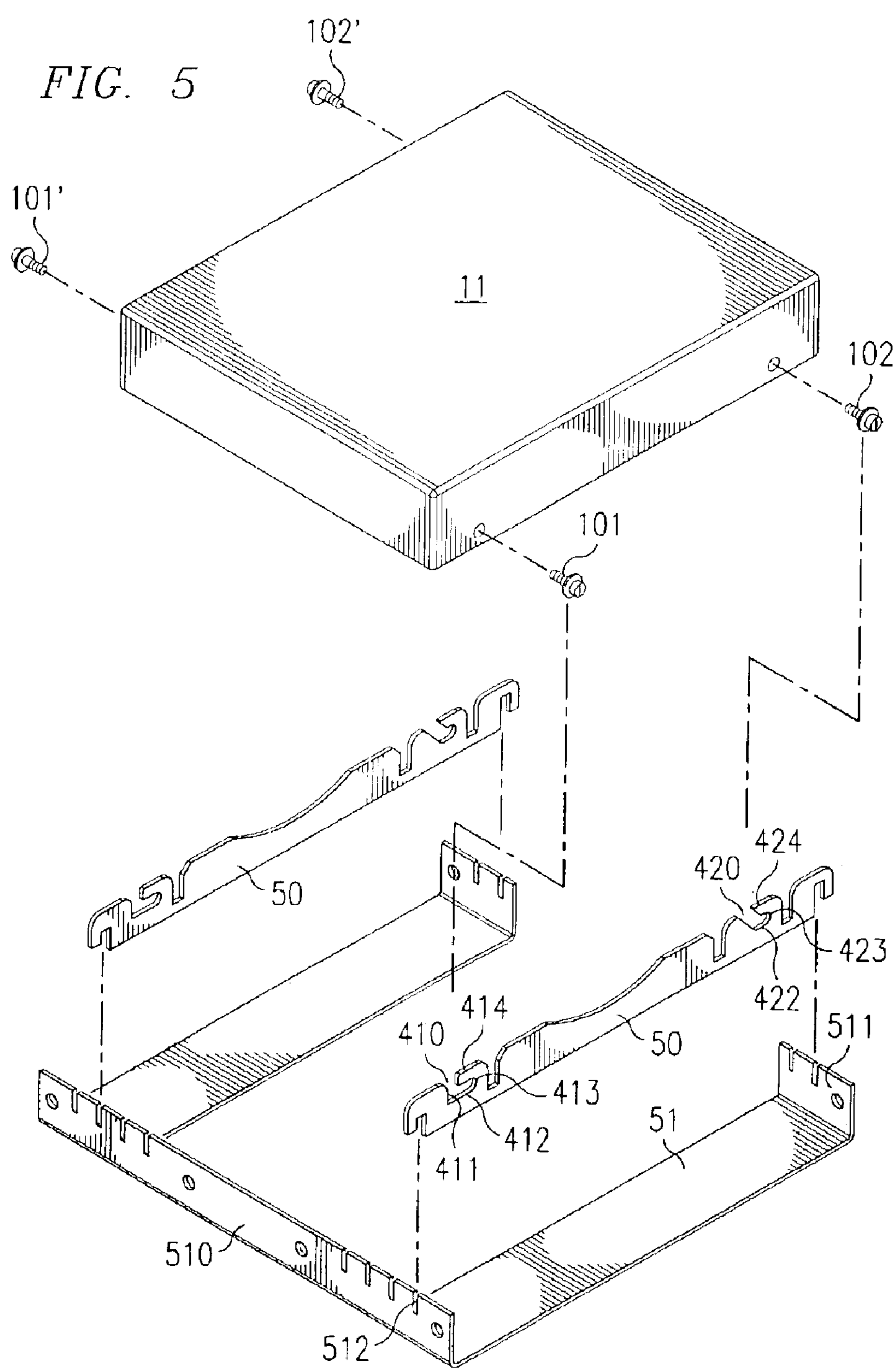
FIG. 5 is a perspective view of a second illustrative embodiment.

FIG. 5 is a perspective view of a second illustrative embodiment having support 51 where side supports 50 are constructed separately for positioning inside housing 12 by interlocking supports 50 front and back with support 51. Slots 512, in front 510 and back 511 can be used for this purpose. Brackets 50 can be moved laterally from side to side across housing 12 to accommodate different size apparatuses 11.

In one embodiment, the fastening devices are ¼" long and have a diameter of ⅛", with a head of ¼" and the bracket slots are 5/32" wide, with the bracket being 1/16" thick, but it should be realized that any combination of sizes would work. Standard sizes, micro sizes, as well as macro sizes (bridges, builders) can use the concepts disclosed herein.

What is claimed is:

1. A system for mounting a device within a housing, said system comprising:

at least one first bracket having a top opening slot into which a shank of a fastener located at a leading portion of said device can engage, said first bracket also having a slot communicating with said top opening slot, said top opening slot adapted for receiving said fastener when said device is moving perpendicular to the direction of insertion of said device into said housing, said communicating slot adapted for allowing said fastener shank inserted into said top opening slot to move laterally with respect to said direction of insertion, and wherein said slots of said first bracket comprise an L shape with the slot having said opening perpendicular to said communicating slot, and at least one second bracket having a top opening into which a shank of a fastener located at a trailing portion of said device can engage, said second bracket having a slot communicating with said top opening, said second bracket top opening adapted for receiving said trailing portion fastener when said device is moving perpendicular to the direction of insertion of said device into said housing, said second bracket communicating slot adapted for forcing a fastener inserted into said second bracket top opening to move diagonally along said lateral direction, said diagonal movement serving to laterally move said fastening device which has been positioned into said first bracket along said first bracket communicating slot.

2. The system of claim 1 wherein said diagonal movement is toward said trailing portion of said device.

3. The system of claim 1 wherein at least a portion of said slot of said second bracket comprises a ramp.

4. The system of claim 1 wherein said slots are wide enough to accept said fastener shank and not wide enough to accept a head of said fastener.

5. The system of claim 1 wherein said slots are at least 1/16 inch wide.

6. The system of claim 1 further comprising at least one other first bracket positioned to engage a second fastener located at a leading edge of said device.

7. The system of claim 1 further comprising at least one other second bracket positioned to engage a second fastener located at a trailing edge of said device.

8. The system of claim 1 further comprising at least one other first bracket positioned to engage a second fastener located at a leading edge of said device and at least one other second bracket positioned to engage a second fastener located at a trailing edge of said device.

9. The system of claim 8 wherein said other brackets are spaced apart to receive fasteners spaced apart on said device.

10. The system of claim 1 wherein said brackets are permanently affixed to said housing.

11. The system of claim 10 further comprising at least one area between said affixed brackets adapted for receiving a user's fingers while engaging said device with said brackets.

* * * * *